I. G. McQUILLAN.
WIND SHIELD.
APPLICATION FILED NOV. 9, 1910.

1,057,570.

Patented Apr. 1, 1913.
2 SHEETS—SHEET 1.

WITNESSES
Stephen Wach
Mary C. Cahoon

INVENTOR
Isaac G. McQuillan
By Fredk W. Winter
Attorney

I. G. McQUILLAN.
WIND SHIELD.
APPLICATION FILED NOV. 9, 1910.

1,057,570.

Patented Apr. 1, 1913.
2 SHEETS—SHEET 2.

WITNESSES
Stephen Wach.
Mary E. Cahoon.

INVENTOR
Isaac G. McQuillan
By Fredk W Winter
Attorney

UNITED STATES PATENT OFFICE.

ISAAC G. McQUILLAN, OF PITTSBURGH, PENNSYLVANIA, ASSIGNOR TO WINTERTON MANUFACTURING COMPANY, OF PITTSBURGH, PENNSYLVANIA, A CORPORATION OF PENNSYLVANIA.

WIND-SHIELD.

1,057,570.

Specification of Letters Patent. Patented Apr. 1, 1913.

Application filed November 9, 1910. Serial No. 591,478.

*To all whom it may concern:*

Be it known that I, ISAAC G. McQUILLAN, a resident of Pittsburgh, in the county of Allegheny and State of Pennsylvania, have invented a new and useful Improvement in Wind-Shields, of which the following is a specification.

This invention relates to shields or screens for motor road vehicles, and which are usually termed wind shields.

The invention relates to that type of shield which is formed of sections adjustably hinged together and in which the upper section is capable of being fixed at various angles to the lower section to suit different conditions of wind and weather, or folded entirely out of the way when not required.

The object of the invention is to provide an improved hinge connection between upper and lower shield sections arranged to facilitate the adjustment of the upper section automatically or without the operator leaving the seat.

The invention comprises the construction and arrangement of parts hereinafter described and claimed.

Figure 1:
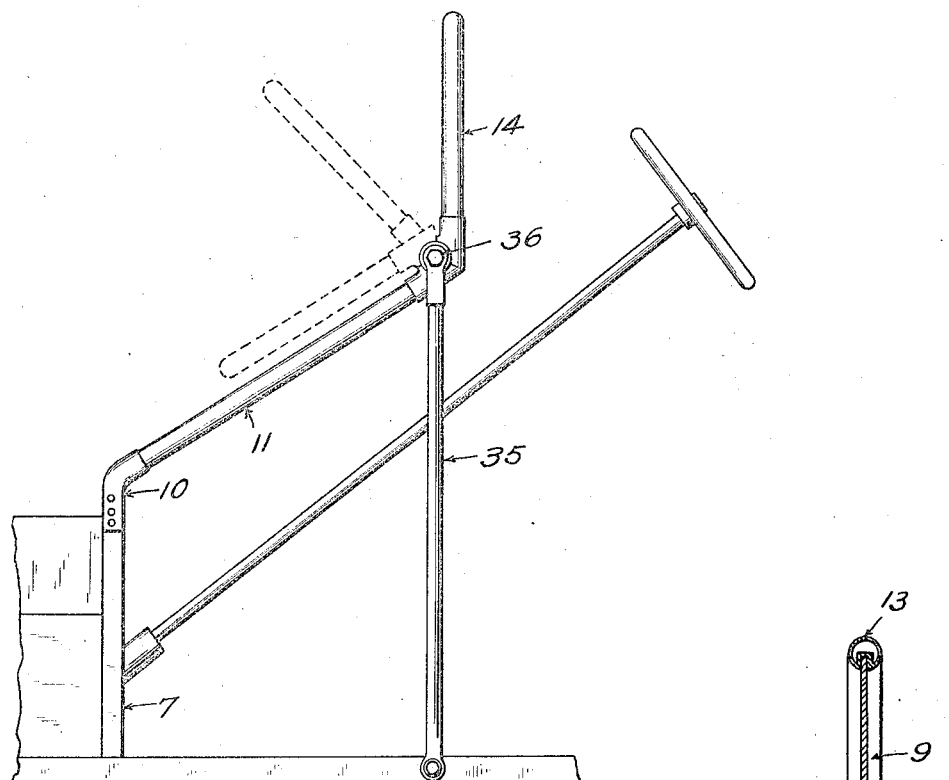
Figure 2:
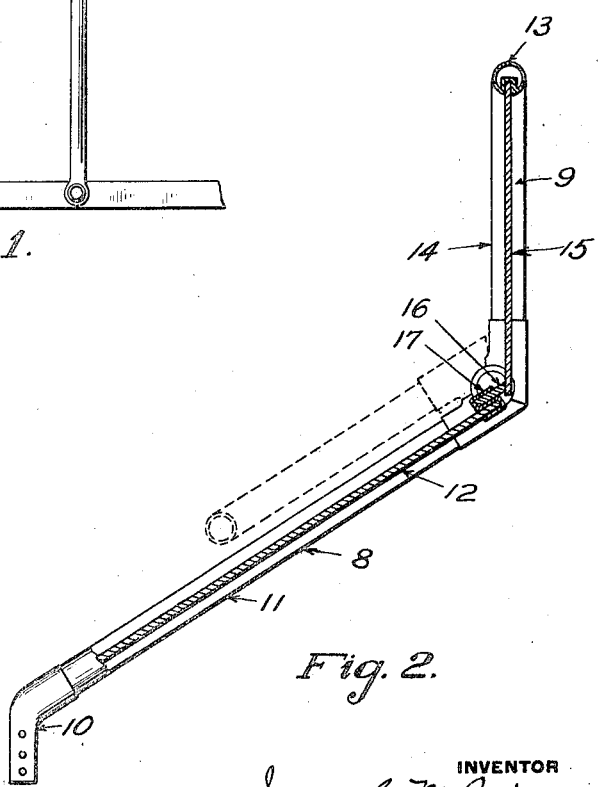
Figure 3:
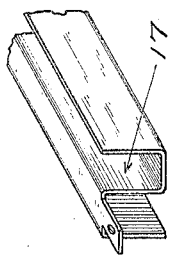
Figure 6:
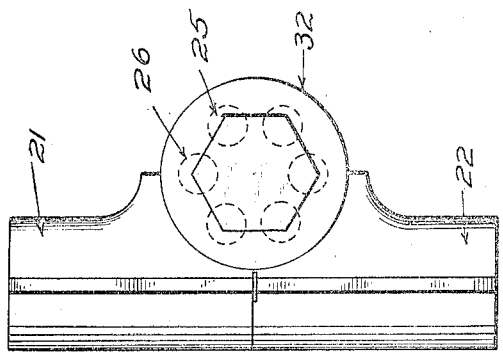
Figure 5:
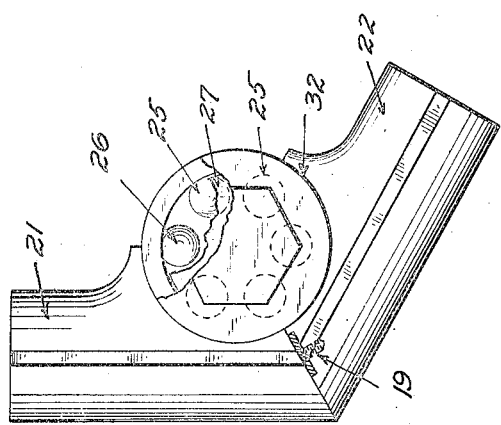
Figure 4:
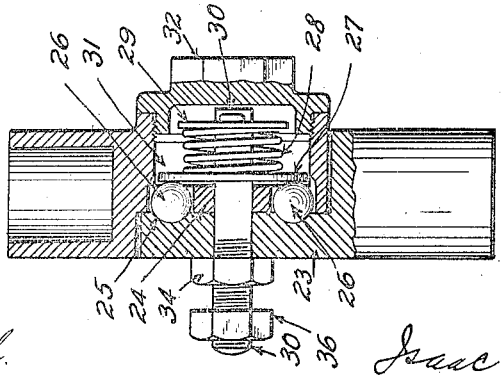

In the accompanying drawings Figure 1 is a side view of a zig-zag type of shield showing my invention applied thereto; Fig. 2 is a sectional view showing the application of the sealing strip at the angle of the shield; Fig. 3 is a perspective view showing an end of the holding strip for the sealing strip; Fig. 4 is a section through one of the hinges longitudinally of its axis; Fig. 5 is a face view partly in section of one of the hinge members; and Fig. 6 is a face view illustrating a modification of the hinge for a shield having a vertical lower section.

In the drawings the reference numeral 7 indicates the dash board or similar member of a motor car or other vehicle, or any other suitable base member to which the shield is attached. The shield comprises a lower section 8 and an upper section 9. The lower section 8 may be vertical, as is most commonly the case, or may be inclined as shown in Figs. 1 and 2. It is secured to the base or dash board 7 by any suitable means such as brackets or clips 10. The lower section comprises, as usual, a frame having a bottom member if desired, and side members 11 provided with grooves on their inner faces for receiving the glass 12, but having no top member or strip. The upper section preferably has a three sided frame comprising a top member 13 and two side members 14 provided with grooves on their inner faces for receiving the glass 15, but having no bottom cross member so that the edges of the glass of the two sections abut to prevent obscuring the vision. The frames are preferably formed from tubes provided with grooves for the glass. This form of frame is old and well known to those familiar with the art.

To prevent the entrance of rain at the angle in the case of the zig-zag shield I provide a suitable sealing strip 16 formed of rubber, felt or other suitable yielding material and which is secured to one of said sections, preferably the lower one, and presses against the glass in the other section. As shown in the drawings this sealing strip is held in a channel 17 of a sheet metal strip bent to double channel form, one channel receiving the strip 16 and the other fitting over the top edge of the glass of the lower shield section. Preferably this holder is formed of brass or other non-corrosive sheet metal and at its end is attached to the hinge members which are secured to the frame side members, the attachment being made, for instance by means of screws 19, Fig. 5. As a consequence this metal channel strip forms a tie connecting the upper ends of the side members of the lower frame, materially strengthening said frame and particularly preventing the free ends of the frame side members from spreading apart.

The upper section 9 is preferably hinged to the lower section 11 by means of automatic hinges so that it can be folded or set at any desired angle by merely pushing or pulling on the same. The specific form of hinge is shown in Figs. 4 and 5. Each hinge comprises two members 21 and 22 which are provided with portions to which the side pieces of the frames of the sections can be conveniently secured, such for instance as making parts of said hinge members hollow or tubular to receive the ends of the tubular frame pieces, as is now the common practice. Each hinge member comprises a substantially circular disk, marked respectively 23 and 24, one of which is provided with a plurality of recesses 25 for receiving the locking members shown in the form of balls 26, held in holes or openings through the disk of the coöperating hinge member, and adapted to drop into the recesses 25. The balls 26 are pressed into their locking seats by means of a follower plate 27 against which presses the inner end of the spring 28, the outer end of which is held by a suitable stationary abutment, which is shown as a head or washer 29 on the outer end of the pivot bolt 30 which secures the two hinge members together. The recesses 25 are concave on circular lines, so that the balls escape therefrom when the upper shield section is sharply pushed or pulled, to provide the automatic action referred to. The plate 27, the spring 28 and the washer 29 are preferably entirely inclosed by being housed in a recess 31 in the hinged member 21, said recess being closed by a threaded cap 32. If desired the outer end of the spring 28 may bear directly against the cap 32 instead of against the washer or head on the outer end of the pivot bolt. The construction shown in the drawing is however preferred.

As many locking recesses 25 as may be desired or necessary will be employed, the drawing showing three sets of such recesses, one of which is adapted to hold the upper shield section in vertical position, the second to hold the upper shield section at an angle to the lower shield section, and the third to hold the upper shield section folded onto the lower shield section. Obviously the number of such sets of locking recesses will be varied according to the particular type of wind shield and the different positions which the upper shield section must assume. Preferably the balls are symmetrically spaced, such as by providing a pair of diametrically opposite balls 26, as shown, in order to balance the pressure of spring plate 27 thereon. Preferably the faces of disks 23 and 24 are of hard metal to resist wear, such as being made of separate pieces and riveted or otherwise secured to the hinge members.

The hinge described can be adapted to shields in which the lower section is vertical by merely changing the form of the two hinge members. Fig. 6 shows a side elevation of the same hinge designed for a shield in which both sections are normally vertical.

The outer end of the pivot bolt 30 receives a nut 34 for securing the hinge sections together and putting the spring 28 in compression. The bolt also preferably is sufficiently long to receive the upper end of brace 35, said brace being held on the bolt by nut 36. These braces in the case of the zig-zag shield usually extend straight downwardly and are secured to the vehicle body, while with a normally vertical shield the braces extend diagonally forwardly and downwardly, as will be readily understood.

What I claim is:

1. A hinge for folding shields for motor vehicles and like uses, comprising relatively movable members rotatably connected together and provided with directly contacting faces transverse to the axis, one of said members being provided in its face with a plurality of locking recesses and the other member having its face formed by a web provided with openings therethrough, said member having a large recess outside of said web, locking members in the openings in said web and projecting beyond both faces thereof and arranged to enter the recesses in the first named hinge member, a plate bearing against said locking members, a spring acting on said plate in line with the axis of the hinge and arranged to press the locking members into the recesses of the coöperating hinge member, said plate and spring being inclosed in the large recess in the second named hinge member, and a closure for the outside of said recess.

2. A hinge for folding shields for motor vehicles and like uses, comprising relatively movable members rotatably mounted on a common axis and provided with directly contacting faces transverse to their axis, one of said members being provided in its face with a plurality of locking recesses, the other member having its face formed by a web provided with openings therethrough and having a large recess outside of said web, locking members in the openings in said web and projecting beyond both faces thereof and arranged to enter the recesses in the first named hinge member, a plate bearing against said locking members, a pivot member axially connecting said hinge members, a spring surrounding said pivot member and interposed between the outer end thereof and said plate and arranged to press the locking members into the recesses of the coöperating hinge member, said plate and spring being inclosed in the large recess in the second named hinge member, and a closure for the outer side of said recess, said closure being independent of said axial pivot member.

In testimony whereof, I have hereunto set my hand.

ISAAC G. McQUILLAN.

Witnesses:
F. W. WINTER,
MARY E. CAHOON.